United States Patent Office 2,736,728
Patented Feb. 28, 1956

2,736,728

PREPARATION OF LYSERGIC ACID AMIDES

Richard P. Pioch, Indianapolis, Ind., assignor to Eli Lilly & Company, Indianapolis, Ind., a corporation of Indiana No Drawing. Application December 6, 1954,
Serial No. 473,443

10 Claims. (Cl. 260—285.5)

This invention relates to the preparation of lysergic acid amides and to a novel intermediate compound useful in the preparation of said amides.

Although only a few natural and synthetic amides of lysergic acid are known, they possess a number of different and useful pharmacologic properties. Especially useful is ergonovine, the N-[l(+)-1-hydroxyisopropyl] amide of d-lysergic acid, which is employed commercially as an oxytocic agent.

Attempts to prepare lysergic acid amides by the usual methods of preparing amides, such as reacting an amine with lysergic acid chloride or with an ester of lysergic acid, have been unsuccessful. United States Patents No. 2,090,429 and No. 2,090,430, describe processes of preparing lysergic acid amides, and although these processes are effective to accomplish the desired conversion of lysergic acid to one of its amides, they are not without certain disadvantages.

By my invention I have provided a simple and convenient method of preparing lysergic acid amides, which comprises reacting lysergic acid with trifluoroacetic anhydride to produce a mixed anhydride of lysergic and trifluoroacetic acids, and then reacting the mixed anhydride with a nitrogenous base having at least one hydrogen linked to nitrogen. The resulting amide of lysergic acid is isolated from the reaction mixture by conventional means.

The reaction of the lysergic acid and the trifluoroacetic anhydride is a low temperature reaction, that is, it must be carried out at a temperature below about 0° C. The presently preferred temperature range is about —15° C. to about —20° C. This range is sufficiently high to permit the reaction to proceed at a desirably fast rate, but yet provides an adequate safeguard against a too rapid reaction which would result in a high reaction temperature and consequent excessive decomposition of the mixed anhydride.

The reaction is carried out in a suitable dispersing agent, that is, one which is inert with respect to the reactants. The lysergic acid is relatively insoluble in dispersants suitable for carrying out the reaction, so it is suspended in the dispersant.

Two mols of trifluoroacetic anhydride are required per mol of lysergic acid for the rapid and complete conversion of the lysergic acid into the mixed anhydride. It appears that one molecule of the anhydride associates with or favors an ionic adduct with one molecule of the lysergic acid which contains a basic nitrogen atom and that it is the adduct which reacts with a second molecule of trifluoroacetic anhydride to form the mixed anhydride along with one molecule of trifluoroacetic acid. The conversion of the lysergic acid to the mixed anhydride occurs within a relatively short time, but to insure a complete conversion the reaction is allowed to proceed for about one to three hours.

The mixed anhydride of lysergic and trifluoroacetic acids is relatively unstable, especially at room temperature and above, and must be stored at a low temperature. This temperature instability of the mixed anhydride makes it desirable that it be converted into a lysergic acid amide without unnecessary delay. The mixed anhydride itself, since it contains a lysergic acid group, also can exist in the reaction mixture in large part as an ionic adduct with trifluoroacetic anhydride or trifluoroacetic acid.

It is important, for maximum yield of product, that the lysergic acid employed in the reaction be dry. It is most convenient to dry the acid by heating it at about 105–110° C. in a vacuum of about 1 mm. of mercury or less, for a few hours, although any other customary means of drying can be used.

The conversion of the mixed anhydride into an amide by reacting the anhydride with the nitrogenous base, such as an amino compound, can be carried out at room temperature or below. Most conveniently the reaction is carried out by adding the cold solution of the mixed anhydride to the amino compound or a solution thereof which is at about room temperature. Because of the acidic components present in the reaction mixture of the mixed anhydride, about five mols or equivalents of the amino compound are required per mol or equivalent of mixed anhydride for maximal conversion of the mixed anhydride to the amide. Preferably a slight excess over the five mols is employed to insure complete utilization of the mixed anhydride. If desired, a basic substance capable of neutralizing the acid components present in the reaction mixture, but incapable of interfering with the reaction, can be utilized. A strongly basic tertiary amine is an example of such a substance. In such case, about one equivalent of the amino compound to be converted to a lysergic acid amide is employed along with a sufficient amount of tertiary amine to neutralize the acidic components. Any excess of the amino compound to be converted to a lysergic acid amide, as well as any unconverted lysergic acid, can be recovered from the reaction mixture and can be re-employed in other conversions.

A preferred method for carrying out the process of this invention is as follows:

Dry lysergic acid is suspended in a suitable vehicle such as acetonitrile, and the suspension is cooled to about —15° C. or —20° C. To the suspension is then added slowly a solution of about two equivalents of trifluoroacetic anhydride dissolved in acetonitrile and previously cooled to about —20° C. The mixture is maintained at a low temperature for about one to three hours to insure the completion of the formation of the mixed anhydride of lysergic and trifluoroacetic acids.

The solution of the mixed anhydride is then added to about five equivalents of the amino compound which is to be reacted with the mixed anhydride. The amino compound need not be previously dissolved in a solvent, although it is usually convenient to use a solvent. The reaction is carried out with the amino compound or solution of amino compound at or about room temperature or below. The reaction mixture is allowed to stand at room temperature for one or two hours, preferably in the dark, and the solvent is then removed by evaporation in vacuo at a temperature which desirably is not greatly in excess of room temperature. The viscous residue consisting of the amide together with excess amine and amine salts, is taken up in a mixture of chloroform and water. The water is separated and the chloroform solution which contains the amide is washed several times with water to remove excess amine and the various amine salts formed in the reaction, including that of any unconverted lysergic acid. The chloroform solution is then dried and evaporated, leaving a residue of the lysergic acid amide. The amide so obtained can be purified by any conventional procedure.

Dispersants suitable for the purpose of this invention are those which are liquids at the low temperatures employed for the reaction and are of such an inert nature that they will not react preferentially to the lysergic acid with trifluoroacetic anhydride. Among suitable dispersants are acetonitrile, dimethylformamide, propionitrile, and the like. Additional suitable agents will readily be apparent from the foregoing enumeration. Of those listed above, acetonitrile is preferred since it is non-reactive and mobile at the low temperature used, and is relatively volatile and hence readily separable from the reaction mixture by evaporation in vacuo.

A wide variety of nitrogeneous bases such as amino compounds can be reacted with the mixed anhydride to form a lysergic acid amide. As previously stated, the amino compound must contain a hydrogen atom attached to nitrogen to permit amide formation. Illustrative amino compounds which can be reacted are ammonia, hydrazine, primary amines such as glycine, ethanolamine, diglycylglycine, norephedrine, aminopropanol, butanolamine, diethylaminoethylamine, and secondary amines such as diethylamine, ephedrine, and the like.

When an alkanolamine such as ethanolamine or aminopropanol is reacted with the mixed anhydride of lysergic and trifluoroacetic acids, the reaction product contains not only the desired hydroxy amide but also, to a minor extent, some amino ester. These two isomeric substances arise because of the bi-functional nature of the reacting alkanolamine. Ordinarily, the amino ester amounts to no more than 25–30 per cent of the total amount of reaction product, but in cases where the amino group is esterically hindered, the proportion of amino ester will be increased. The amino ester can readily be converted to the desired hydroxy amide, and the over-all yield of the latter increased by treating the amino ester, or the mixture of amide and ester with alcoholic alkali to cause the rearrangement of the amino ester to the desired hydroxy amide. Most conveniently the conversion is carried out by dissolving the amino ester or mixture containing the amino ester in a minimum amount of alcohol and adding to the mixture a twofold amount of 4 N alcoholic potassium hydroxide solution. The mixture is allowed to stand at room temperature for several hours, the alkali is neutralized with acid, and the lysergic acid amide is then isolated and purified.

It should be understood that, as used herein, the term "lysergic acid" is used generically as inclusive of any or all of the four possible stereoisomers having the basic lysergic acid structure. Isomers of the lysergic acid series can be separated or interconverted by means known to the art.

This invention is further illustrated by the following specific examples.

EXAMPLE 1

*Preparation of the mixed anhydride of lysergic and trifluoroacetic acids*

5.36 g. of $d$-lysergic acid are suspended in 125 ml. of acetonitrile and the suspension is cooled to about $-20°$ C. To this suspension is added a cold ($-20°$ C.) solution of 8.82 g. of trifluoroacetic anhydride in 75 ml. of acetonitrile. The mixture is allowed to stand at $-20°$ C. for about 1½ hours during which time the suspended material dissolves, and the $d$-lysergic acid is converted to the mixed anhydride of lysergic and trifluoroacetic acids. The mixed anhydride can be separated in the form of an oil by evaporating the solvent in vacuo at a temperature below about 0° C.

EXAMPLE 2

*Preparation of d-lysergic acid N,N-diethyl amide*

A solution of the mixed anhydride of lysergic acid and trifluoroacetic acid in 200 ml. of acetonitrile is obtained by reacting 5.36 g. of $d$-lysergic acid and 8.82 g. of trifluoroacetic anhydride in accordance with the procedure of Example 1. The acetonitrile solution containing the mixed anhydride is added to 150 ml. of acetonitrile containing 7.6 g. of diethylamine. The mixture is held in the dark at room temperature for about two hours. The acetonitrile is evaporated in vacuo leaving a residue which comprises the "normal" and "iso" forms of $d$-lysergic acid N,N-diethyl amide together with some lysergic acid, the diethylamine salt of trifluoroacetic acid and like by-products. The residue is dissolved in a mixture of 150 ml. of chloroform and 20 ml. of ice-water. The chloroform layer is separated, and the aqueous layer is extracted with four 50 ml. portions of chloroform. The chloroform extracts are combined and are washed four times with about 50 ml. portions of cold water in order to remove residual amounts of amine salts. The chloroform layer is then dried over anhydrous sodium sulfate, and the chloroform is evaporated in vacuo. A solid residue of 3.45 g. comprising the "normal" and "iso" forms of $d$-lysergic acid, N,N-diethyl amide is obtained. This material is dissolved in 160 ml. of a 3-to-1 mixture of benzene and chloroform, and is chromatographed over 240 g. of basic alumina. As the chromatogram is developed with the same solvent, two blue fluorescing zones appear on the alumina column. The more rapidly moving zone is $d$-lysergic acid N,N-diethyl amide which is eluted with about 3000 ml. of the same solvent as above, the course of the elution being followed by watching the downward movement of the more rapidly moving blue fluorescing zone. The eluate is treated with tartaric acid to form the acid tartrate of $d$-lysergic acid N,N-diethyl amide which is isolated. The acid tartrate of $d$-lysergic acid N,N-diethyl amide melts with decomposition at about 190–196° C.

The $d$-iso-lysergic acid N,N-diethyl amide which remains adsorbed on the alumina column as the second fluorescent zone is removed from the column by elution with chloroform. The "iso" form of the amide is recovered by evaporating the chloroform eluate to dryness in vacuo.

EXAMPLE 3

*Preparation of d-lysergic acid N-diethylaminoethyl amide*

A solution of the mixed anhydride of lysergic acid and trifluoroacetic acid is prepared from 2.68 g. of $d$-lysergic acid and 4.4 g. of trifluoroacetic acid anhydride in 100 ml. of acetonitrile by the method of Example 1. This solution is added to 6.03 g. of diethylaminoethylamine. The reaction mixture is kept in the dark at room temperature for 1½ hours. The acetonitrile is evaporated, and the residue treated with chloroform and water as described in Example 2. The residue comprising $d$-iso-lysergic acid N-diethylaminoethyl amide is dissolved in several ml. of ethyl acetate, and the solution is cooled to about 0° C. whereupon $d$-iso-lysergic acid N-diethylaminoethyl amide separates in crystalline form. The crystalline material is filtered off, and the filtrate reduced in volume to obtain an additional amount of crystalline amide. Recrystallization from ethyl acetate of the combined fractions of crystalline material yields $d$-iso-lysergic acid N-diethylaminoethyl amide melting at about 157–158° C. The optical rotation is as follows: $[\alpha]_d^{26} = +372°$ (c.=1.3 in pyridine).

EXAMPLE 4

*Preparation of ergonovine*

A solution of the mixed anhydride of lysergic acid and trifluoroacetic acid is prepared from 530 mg. of $d$-lysergic acid and 930 mg. of trifluoroacetic anhydride in 30 ml. of acetonitrile at $-20°$ C. by the method of Example 1. The solution containing the mixed anhydride is added to a solution of 300 g. of $l(+)$-2-aminopropan-1-ol, and 640 mg. of triethylamine in 15 ml. of acetonitrile, the triethylamine being employed to displace any $l(+)$-2-aminopropan-1-ol from adducts with acid components of the reaction mixture. After 15 minutes of standing at room temperature, the reaction mixture is filtered, and the crystalline material thus obtained is washed with acetonitrile and dried in air. This material is substantially pure *d*-lysergic acid. The filtrate which contains the desired reaction product is evaporated to dryness in vacuo. The residue is treated with chloroform and water in accordance with the procedure of Example 2. The combined chloroform extracts are evaporated yielding a crystalline material which separates when the volume of residual solution is decreased to about 2 ml. The solution is chilled, thereby causing further crystalline material to separate from solution. The crystalline material is substantially pure ergonovine. The crystalline ergonovine is removed from the solution by filtration, is washed with cold chloroform and dried. It melts at about 153–154° C. Paper chromatography shows that this compound is identical with authentic ergonovine produced from crude ergot.

The mother liquors and chloroform washes from the above crystallization of ergonovine are combined, and the solvents are evaporated in vacuo. The residue containing ergonovinine (the "iso" form of ergonovine) is dissolved in 2 ml. of ethyl acetate. From this solution crystalline ergonovinine precipitates almost immediately. The crystals are separated by filtration and dried. A sample melts at about 188–190° C. The ergonovinine can be isomerized to ergonovine with alkali by known procedures, for example by employing the method of Stoll and Hofmann, Helvetica Chimica Acta 26, 944 (1943).

The ethyl acetate mother liquor from the preceding isolation of ergonovinine is evaporated to dryness in vacuo and the residue, comprising the 1-aminopropan-2-ol esters of *d*-lysergic acid and of *d*-iso-lysergic acid, are dissolved in 2 ml. of ethanol. 0.4 ml. of 4 N potassium hydroxide solution in 50 per cent aqueous ethanol are then added, and the resulting mixture is allowed to stand at room temperature in the dark for about two hours. This treatment of the aminopropanol esters of *d*-lysergic acid and *d*-isolysergic acid with base rearranges them to the propanol amides of *d*-lysergic acid and *d*-iso-lysergic acid, which are ergonovine and ergonovinine, respectively. Solid carbon dioxide is added to the reaction mixture in order to neutralize the potassium hydroxide. The solvents are then removed in vacuo and the residue of ergonovine and ergonovinine is separated into its components by the procedure described above.

EXAMPLE 5

*Preparation of ergonovine*

5.36 g. (0.02 m.) of *d*-lysergic acid dissolved in 125 ml. of acetonitrile are mixed with 8.8 g. (0.042 m.) of trifluoroacetic anhydride dissolved in 75 ml. of acetonitrile, thus forming a mixed anhydride of lysergic and trifluoroacetic acids. The reaction mixture is allowed to stand for a period of 1¾ hours while the temperature is maintained between −15° C. and −18° C. A solution of 7.8 g. (0.104 m.) of *l*(+)-2-aminopropan-1-ol in 200 ml. of acetonitrile is added to the solution of the mixed anhydride and the reaction mixture is kept in the dark at room temperature for 1½ hours. The solvent is removed in vacuo and the resulting solid residue is treated with 25 ml. of an ice-water mixture and then extracted four times with 225 ml. portions of chloroform. The combined chloroform extracts are washed with very dilute sodium hydroxide solution and are dried over anhydrous sodium sulfate. Evaporation of the chloroform in vacuo to a volume of a few ml. yields crystalline ergonovine which is filtered and dried. It melts at about 155–156° C. The mother liquors from the crystalline ergonovine filtration are then treated as in Example 4 to recover both ergonovinine and the aminopropanol esters of *d*-lysergic acid and *d*-iso-lysergic acid.

EXAMPLE 6

*Preparation of lysergic acid hydrazide*

A mixed anhydride is prepared from 530 mg. of *d*-lysergic acid and 840 mg. of trifluoroacetic anhydride in 25 ml. of acetonitrile by the method of Example 1. This solution is added to 15 ml. of an acetonitrile solution at 0° C. containing 320 mg. of anhydrous hydrazine. The reaction mixture is allowed to stand for 1½ hours at room temperature in the dark. The solvent is then removed by evaporation in vacuo. The residue comprising *d*-lysergic acid hydrazide and *d*-iso-lysergic acid hydrazide is purified by the procedure described in Example 2.

EXAMPLE 7

*Preparation of ergine (lysergic acid amide)*

A solution of the mixed anhydride of lysergic and trifluoroacetic acids is prepared by the method of Example 1 from 530 mg. of *d*-lysergic acid and 840 mg. of trifluoroacetic anhydride in 25 ml. of acetonitrile. About 5 ml. of anhydrous liquid ammonia are added to this solution, thus lowering the temperature to about −35° C. The mixture is allowed to warm up to room temperature during a three hour period during which time the bulk of the ammonia evaporates. The acetonitrile and any residual ammonia are then removed by evaporation in vacuo, and the residue is treated with water and chloroform as described in Example 2. The solid residue remaining after evaporation of the washed and dried chloroform extracts is a mixture of ergine and iso-ergine.

I claim:

1. The method which comprises reacting dry lysergic acid with trifluoroacetic anhydride at a temperature below about 0° C. to produce a mixed anhydride of lysergic and trifluoroacetic acids, and reacting said mixed anhydride with a nitrogenous base having at least one hydrogen linked to nitrogen, thereby to produce a lysergic acid amide.

2. The method which comprises reacting dry lysergic acid at a temperature below about 0° C., with about two equivalents of trifluoroacetic anhydride, in a dispersant which is inert with respect to the reactants, to produce the mixed anhydride of lysergic and trifluoroacetic acids, and combining said mixed anhydride with about five equivalents of a nitrogenous base having at least one hydrogen linked to nitrogen, thereby to produce a lysergic acid amide, and isolating said amide.

3. The method which comprises treating a suspension of dry lysergic acid in acetonitrile at about −15° C. with a solution of about two equivalents of trifluoroacetic anhydride in acetonitrile at about −15° C. to produce a solution containing the mixed anhydride of lysergic and trifluoroacetic acids, and combining said solution at a temperature of about room temperature with at least one equivalent of a nitrogenous base having at least one hydrogen linked to nitrogen, thereby to produce a lysergic acid amide.

4. The method which comprises treating a suspension of dry lysergic acid in acetonitrile at about −15° C. with a solution of about two equivalents of trifluoroacetic anhydride in acetonitrile at about −15° C. to produce a solution containing the mixed anhydride of lysergic and trifluoroacetic acids, and combining said solution at a temperature of about room temperature with a primary amine, thereby to produce a lysergic acid amide.

5. The method which comprises treating a suspension of dry lysergic acid in acetonitrile at about −15° C. with a solution of about two equivalents of trifluoroacetic anhydride in acetonitrile at about −15° C. to produce a solution containing the mixed anhydride of lysergic acid and trifluoroacetic acid, and combining said solution at a temperature of about room temperature with *l*(+)-2-aminopropan-1-ol, thereby to produce lysergic acid N-[*l*1(+)-1-hydroxyisopropyl] amide, and isolating said amide.

6. The method according to claim 5 in which the lysergic acid is *d*-lysergic acid.

7. The method according to claim 6 in which about five equivalents of $l(+)$-2-aminopropan-1-ol are used.

8. The process step which comprises reacting dry lysergic acid with trifluoroacetic anhydride at a temperature below about 0° C. in a dispersing agent which is inert with respect to the reactants.

9. The process step which comprises reacting an acetonitrile suspension of dry lysergic acid with an acetonitrile solution of about two equivalents of trifluoroacetic anhydride, said reaction being carried out at a temperature of about −10° C. to about −20° C., thereby to produce the mixed anhydride of lysergic and trifluoroacetic acids.

10. The mixed anhydride of lysergic and trifluoroacetic acids.

References Cited in the file of this patent
UNITED STATES PATENTS 648,580   Béhal _____ May 1, 1900

OTHER REFERENCES

Holysz et al.: J. Am. Chem. Soc., vol. 72, pp. 4760–63 (1950).